United States Patent [19]

Kaneko

[11] Patent Number: 5,739,777
[45] Date of Patent: Apr. 14, 1998

[54] INTERFACE SYSTEM COMMON TO V24/V28 AND V35

[75] Inventor: Ryuichi Kaneko, Tokyo, Japan

[73] Assignee: NEC Corporation, Tokyo, Japan

[21] Appl. No.: 616,616

[22] Filed: Mar. 15, 1996

[30] Foreign Application Priority Data

Mar. 17, 1995 [JP] Japan ................... 7-086134

[51] Int. Cl.$^6$ ................................. H04M 7/00
[52] U.S. Cl. ............................ 341/50; 370/29
[58] Field of Search ............................ 341/50, 55

[56] References Cited

U.S. PATENT DOCUMENTS

| | | | |
|---|---|---|---|
| 4,525,830 | 7/1985 | Cohen et al. | 370/60 |
| 5,124,976 | 6/1992 | Lemaistre et al. | 370/29 |
| 5,237,561 | 8/1993 | Pyhalammi | 370/29 |
| 5,285,199 | 2/1994 | Pocek | 340/825.03 |

*Primary Examiner*—Marc S. Hoff
*Attorney, Agent, or Firm*—Sughrue, Mion, Zinn, Macpeak & Seas, PLLC

[57] ABSTRACT

There is provided an interface in which an external connection connector can be used in common to signal conversion circuits when V24/V28 and V35 interfaces recommended by CCITT are used in common, so that the number of parts can be reduced and the sized can be reduced. A V24/V28 interface signal is utilized for part of the V35 interface so that part of the interface conversion circuit may be used in common, and either one of a V24/V28 exclusive conversion unit and a V35 exclusive conversion unit is selected by means of a switch. A connector in the form of an RS232C is used. A V35 exclusive signal is assigned to a pin which is not used when the interface converter is used as the V24/V28 interface but the connector is connected to a V35 connector through a conversion cable when the interface converter is used as the V35 interface.

6 Claims, 5 Drawing Sheets

D sub-type 25 pins (ISO 2110)

| PIN NUMBER | SIGNAL | DIRECTION OF SIGNAL | |
|---|---|---|---|
| | | DTE | DCE |
| 1 | FG | - | |
| 2 | SD+ | → | |
| 3 | RD+ | ← | |
| 4 | RS | → | |
| 5 | CS | ← | |
| 6 | DR | ← | |
| 7 | SG | - | |
| 8 | CD | ← | |
| 9 | | | |
| 10 | RD- | ← | |
| 11 | ST2+ | ← | |
| 12 | | | |
| 13 | RT+ | ← | |
| 14 | | | |
| 15 | ST2- | ← | |
| 16 | | | |
| 17 | RT- | ← | |
| 18 | | | |
| 19 | | | |
| 20 | ER | → | |
| 21 | | | |
| 22 | CI | ← | |
| 23 | SD- | → | |
| 24 | | | |
| 25 | | | |

FIG.2

| D sub - type 25 pines | V35 connector | |
| --- | --- | --- |
| PIN NUMBER | PIN NUMBER | SIGNAL |
| 1 | A | FD |
| 2 | P | SD+ |
| 23 | S | SD- |
| 3 | R | RD+ |
| 10 | T | RD- |
| 4 | C | RS |
| 5 | D | CS |
| 6 | E | DR |
| 8 | F | CD |
| 11 | Y | ST2+ |
| 15 | AA | ST2- |
| 13 | V | RT+ |
| 17 | X | RT- |
| 20 | H | ER |
| 22 | J | CI |
| 7 | B | SG |
| 12 | U | ST1+ |
| 24 | W | ST1- |
| 25 | NN | TI |

(CONVERSION CABLE)

FIG.3

D sub-type 25 pins (ISO 2110)

| PIN NUMBER | SIGNAL | DIRECTION OF SIGNAL DTE / DCE |
|---|---|---|
| 1 | FG | - |
| 2 | SD | → |
| 3 | RD | ← |
| 4 | RS | → |
| 5 | CS | ← |
| 6 | DR | ← |
| 7 | SG | - |
| 8 | CD | ← |
| 9 | | |
| 10 | | ← |
| 11 | | ← |
| 12 | | |
| 13 | | ← |
| 14 | | |
| 15 | ST2 | ← |
| 16 | | |
| 17 | RT- | ← |
| 18 | | |
| 19 | | |
| 20 | ER | → |
| 21 | | |
| 22 | CI | ← |
| 23 | | |
| 24 | | |
| 25 | | |

INTERFACE SYSTEM COMMON TO V24/V28 AND V35

BACKGROUND OF THE INVENTION

The present invention relates to an interface conversion system and more particularly to a V24/V28 and V35 interface conversion system.

A conventional interface conversion system has as shown in FIG. 4 a V24/V28 conversion unit 1 for converting a signal of TTL level into a signal of V24/V28 level, a V35 conversion unit 2 for converting a signal of TTL level into a signal of V35 level, an RS232C connector 3 used as an external connection connector for V24/V28 signal, a V35 connector 4 used as an external connection connector for V35 signal, a general-purpose RS232C cable 5 and a general-purpose V35 cable 6.

The V series recommendation is a recommendation concerning data transmission in a telephone network standardized by ITU-TS (International Electric and Communication Engineers Union, former CCITT). More particularly, the V. 24 prescribes connection circuits and operation thereof (for example, the definition of a circuit, the correspondence between a pin and a circuit, the direction of a signal, the operation of each circuit and the mutual relation between individual circuits) in connection with interconnection between DTE (data terminal equipment) and DCE (data circuit terminating equipment) and has substantially the same function as that of RS-232C defined by EIA (US Electronic Industry Association). The V.24 stipulates that for mechanical characteristics (physical conditions), ISO2110 "25-pin DTE/DCE interface connector and arrangement", that is, a 25-pin D sub-type connector pursuant to ISO2110 be used and the V.28 be applied to electric characteristics. For reference, the correspondence between the name of interconnection circuit (signal) and the pin number as well as the direction of signal prescribed by the V.24 is shown in FIG. 5. An interconnection circuit (signal) FG represents ground or earth for preservation, a signal SD transmission data from the DTE to the DCE, a signal RD receiving data, a signal RS a transmission request, a signal CS the condition ready for transmission, a signal DR the condition ready for data set, a signal SG ground for signal or a common fly-back line, a signal CD data channel receiving carrier detection, a signal ST2 transmitting signal element timing, a signal RT receiving signal element timing, a signal ER the condition of ready data terminal, and a signal CI call display.

The V. 28 prescribes electrical conditions (for example, voltage and output impedance on the signal transmission side, and input resistance, operating voltage and logical definition on the operating speed receiving side), of an unbalanced double-current interconnection circuit which normally operates at a data transmission speed of 20 k bits/sec. or less between the DTE (data terminal equipment) and the DCE (data circuit terminating equipment) and has substantially the same standards as those of EIA RS232C, using a connector of the type of, for example, ISO2110 (25-pin D sub-type connector).

The V. 35 prescribes electrical characteristics of an exclusive balanced double-current circuit having a data transmission speed of 48 k bits/second, makes reference to the V. 36 and V. 37 for the modulation system and uses, for example, the V. 11 (balanced double-current circuit), as an interface. The pin number and the signal (interconnection circuit) in the V. 35 connector are shown, for reference, at right section in FIG. 3. In the V. 35, a 34-pin connector of ISO standards (IS2593) is preferably used. In FIG. 3, a signal FG represents ground or earth for preservation, signals SD± transmission data, signals RD± receiving data, a signal RS a transmission request, a signal CS the condition ready for transmission, a signal DR the condition ready for data set, a signal SG ground for signal or fly-back line, a signal CD data channel receiving carrier detection, signals ST2± and ST1± transmission signal element timings, signals RT± receiving signal element timings, a signal ER the condition of ready data terminal, a signal CI call display and a signal TI test display.

The RS (recommended standard) 232C is a standard for prescribing mechanical characteristics and electrical characteristics of a physical interface used in the case where, for example, computers are interconnected to each other or a computer or a personal computer is connected to a peripheral unit such as a printer, plotter or mouse so as to convert data (equivalent to, for example, the V.24).

In the conventional interface conversion system, however, external connection connectors must be prepared for different kinds of interfaces and interface conversion circuits must be provided independently for different kinds of interfaces, with the result that reduction in size of the system is limited and reduction in cost is impaired.

SUMMARY OF THE INVENTION

The present invention intends to solve the above problems and it is an object of the present invention to provide an interface conversion system which can permit an external connection connector to be used in common to signal conversion circuits when CCITT recommended V24/V28 and V35 interfaces are used in common, thereby attaining reduction in the number of parts and reduction in size.

To accomplish the above object, according to one aspect of the present invention, a V24/V28 and V35 common interface system comprises a V24/V28-V35 common conversion unit for receiving common signals of V24/V28 signal and V35 signal and performing interface conversion of these signals, a V24/V28 exclusive conversion unit for receiving a V24/V28 exclusive signal and performing interface conversion thereof, a V35 exclusive conversion unit for receiving a V35 exclusive signal and performing interface conversion thereof, and a connector having a pin which is not used when the system is used as a V24/V28 interface and to which a V35 signal is assigned.

Preferably, according to the present invention, the connector is connected to the V24/V28-V35 common conversion unit and is selectively connectable to either one of the V24/V28 exclusive conversion unit and the V35 exclusive conversion unit through switching means.

Preferably, according to the present invention, the connector is a connector which is compatible with the RS232C standards.

Preferably, according to the present invention, when the system is used as a V35 interface, the V35 exclusive conversion unit is connected to the connector, and the connector is connected to a V35 connector of a connection destination through a predetermined conversion cable.

Preferably, according to the present invention, when the system is used as the V24/V28 interface, the V24/V28 exclusive conversion unit is connected to the connector, and the connector is connected to an RS232C connector of a connection destination through an ordinary RS232C cable.

According to another aspect of the present invention, a common interface system comprises common conversion means for receiving signals common to a plurality of interfaces of mutually different standards and performing interface conversion of the common signals, a plurality of exclusive conversion means for receiving a signal dedicated to each of the plurality of interfaces and performing interface conversion of the dedicated signal, and one connector having compatibility with at least one of standards of the plurality of interfaces, whereby either one of the plurality of exclusive conversion means is electrically connected selectively to the connector in accordance with the kind of a selected interface.

In the present invention, the signal of the V24/V28 interface is utilizable for part of the V35 interface so that part of the interface conversion circuit may be used in common, either one of the V24/V28 exclusive conversion unit and the V35 exclusive conversion unit is selected by the switch, and the RS232C connector is used so that a pin which is not used when the system is used as the V24/V28 interface may be assigned with a V35 interface exclusive signal. When the system is used as the V24/V28 interface, interconnection between systems is effected using the ordinary RS232C connection cable of and when the system is used as the V35 interface, connection to a destination V35 interface is effected through a cable for conversion of the RS232C connector into a V35 connector. Therefore, according to the present invention, the number of parts can be reduced to realize scale reduction and the external connection connector can be used in common to the two interfaces, thereby permitting size reduction and cost reduction.

BRIEF DESCRIPTION OF THE DRAWINGS

FIG. 2 is a diagram showing an example of correspondence between the pin number and the signal during use of a V35 interface in an RS232c special pin assign connector according to an embodiment of the present invention.

FIG. 3 is a diagram useful to explain connection between a conversion cable and the RS232C special pin assign connector as well as a V35 connector according to an embodiment of the present invention.

FIG. 5 is a diagram showing correspondence between the pin number and the signal (interconnection circuit) in a V24/V28 interface.

DESCRIPTION OF THE PREFERRED EMBODIMENTS

The present invention will now be described by way of example with reference to the accompanying drawings.

Figure 1:
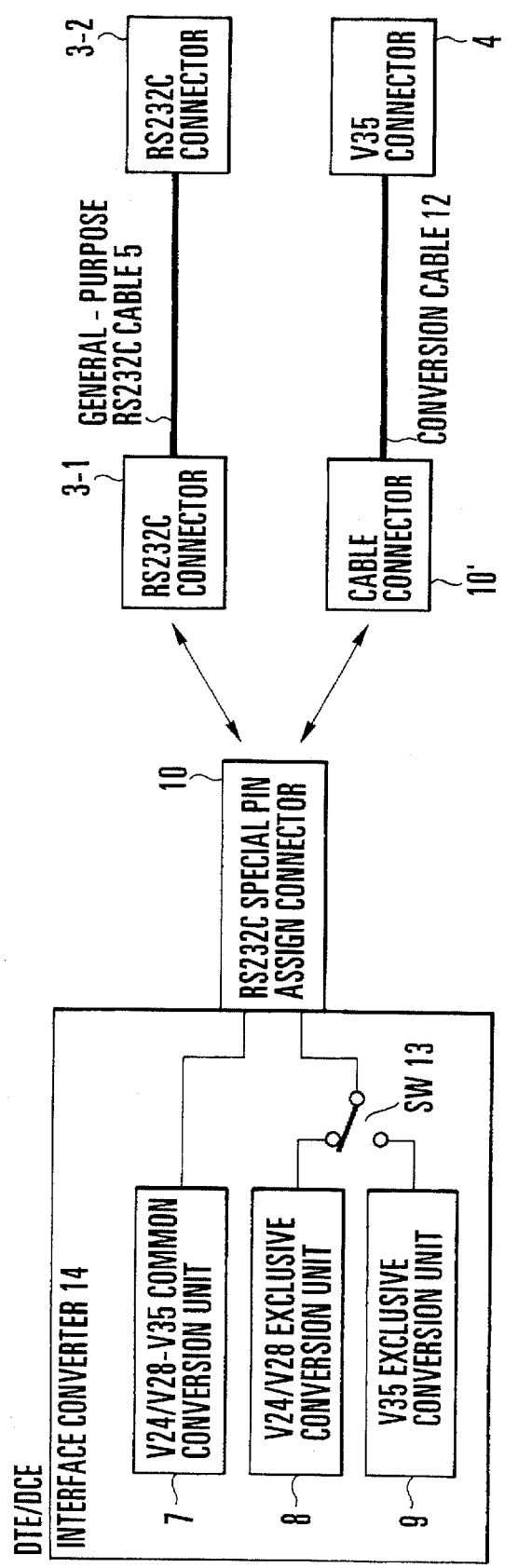
FIG. 1 is a block diagram showing the construction of an embodiment of a system according to the present invention.
Figure 4:
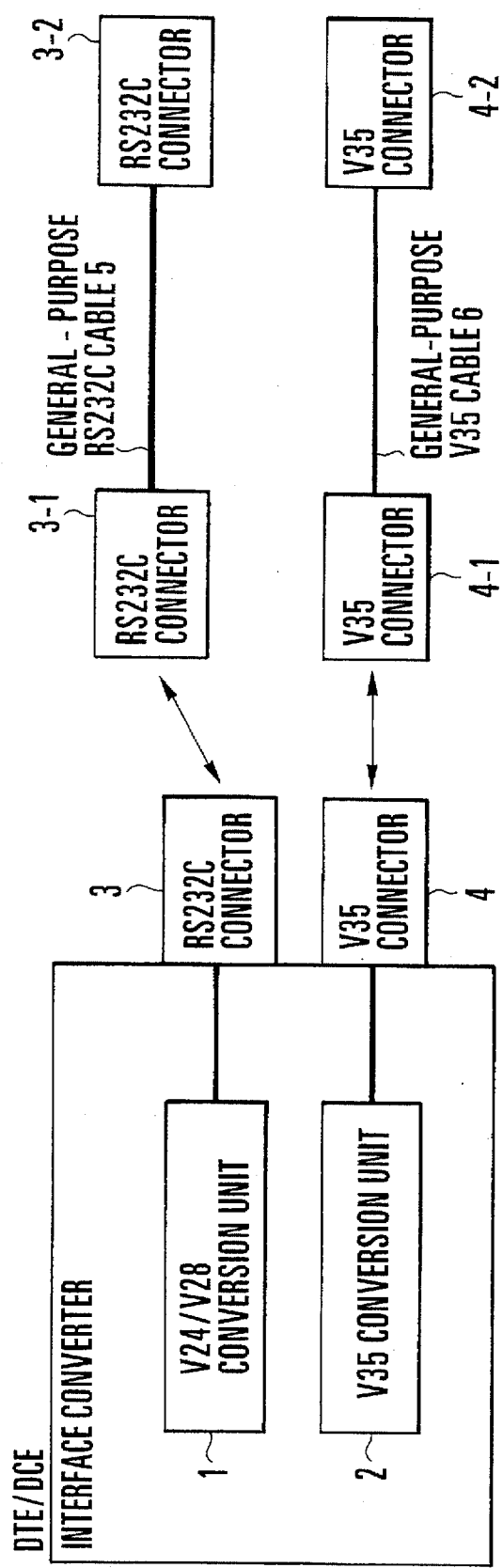
FIG. 4 is a block diagram showing the construction of a conventional system.

Referring to FIG. 1, there is illustrated in block form an embodiment of a V24/V28 and V35 common interface system according to the present invention. A TTL level signal such as communication data or a control signal is supplied to an interface converter 14 so as to be converted into a V24/V28 interface signal or a V35 interface signal. In particular, transmitting/receiving data (SD, RD), a clock signal(ST, RT) and the like undergo level conversion in a V24/V28 exclusive conversion unit 8 and a V35 exclusive conversion unit 9 provided for individual interfaces but other signals undergo level conversion in a V24/V28-V35 common conversion unit 7.

When operating the interface converter 14 as the V24/V28 interface conversion unit, an exclusive conversion unit selecting switch SW 13 is transferred to the V24/V28 exclusive conversion unit 8 in order that a V24/V28 level signal subject to level conversion by means of the V24/V28 exclusive conversion unit 8 and a V24/V28-V35 common signal subject to level conversion by means of the V24/V28-V35 common conversion unit 17 are delivered to an RS232C special pin assign connector 10. The RS232C special pin assign connector 10 is constructed of, for example, a 25-pin D type sub-connector having mechanical construction such as a connector shape which is compatible with a connector 3-1 of a general-purpose RS232C cable 5. Accordingly, the connector 10 is connected to an RS232C connector (not shown) of a connection destination through the general-purpose RS232C cable 5.

On the other hand, when operating the interface unit 14 as the V35 interface conversion unit, the exclusive conversion unit selecting switch SW 13 is transferred to the V35 exclusive conversion unit 9 in order that a V35 level signal and a V24/V28-V35 common signal are delivered to the RS232C special pin assign connector 10. One cable connector 10' of a conversion cable 12 is connected to the RS232C special pin assign connector 10 so that the connector 10 may be connected to a general-purpose V35 connector (not shown) through the other cable connector which is a V35 connector 4.

Referring now to FIG. 2, there is shown an example of correspondence between the pin number and the signal (symbol of interconnection circuit) in the RS232C special pin assign connector 10 constructed of the 25-pin D type sub-connector when the interface converter 14 is operated as the V35 interface conversion unit. As shown in FIG. 2, signals in the V35 interface, other than transmitting/receiving data (SD±, RD±) and transmitting/receiving signal element timings (ST2±, RT±), are made to be common to pin numbers of the FIG. 5 25-pin D type sub-connector of the V24/V28 interface.

Referring to FIG. 3, there is shown mapping effected by the conversion cable 12 between the pin number in the RS232C special pin assign connector 10 and the pin number in the V35 connector when the interface converter 14 is operated as the V35 interface conversion unit. For example, pin numbers 2 and 23 in the RS232C special pin assign connector 10 are connected to pin numbers P and S in the V35 connector, respectively.

The present invention has been described by way of example but it is in no way limited to the embodiments set forth so far and may of course be modified or altered within the framework of the principle of the present invention.

As described above, according to the present invention, the number of parts can be reduced as compared to the independent type system by providing the interface common conversion unit, thereby ensuring that scale reduction can advantageously be attained and besides the external connection connector can be used in common to the two interfaces to permit size reduction and cost reduction.

Further, according to the present invention, the inexpensive general-purpose RS232C connector feasible for mass-production is used as the connector so that when the interface converter is used as the V24/V28 interface, the general-purpose RS232 cable may be utilized for interconnection between systems, thereby reducing the cost of the system as a whole to advantage.

What is claimed is:

1. A V24/V28 and V35 common interface system comprising:

a V24/V28-V35 common conversion unit for receiving a first input signal to be converted into a signal which is common to both a V24/V28 signal and a V35 signal and performing an interface conversion on the first signal;

a V24/V28 exclusive conversion unit for receiving a second input signal to be converted into a V24/V28 exclusive signal and performing an interface conversion on the second input signal;

a V35 exclusive conversion unit for receiving a third input signal to be converted into a V35 exclusive signal and performing an interface conversion on the third signal; and a single connector which receives converted signals from said V24/V28-V35 common conversion unit, and one of said exclusive conversion units, said connector having a pin which is not used when said system is used as a V24/V28 interface and to which a V35 signal is assigned.

2. A V24/V28 and V35 common interface system according to claim 1, wherein said connector is connected to said V24/V28-V35 common conversion unit and is selectively connectable to either one of said V24/V28 exclusive conversion unit and said V35 exclusive conversion unit through switching circuit.

3. A V24/V28 and V35 common interface system according to claim 1 or 2, wherein said connector is a connector which is compatible with the RS232C standards.

4. A V24/V28 and V35 common interface system according to claim 2, wherein when said system is used as a V35 interface, said V35 exclusive conversion unit is connected to said connector, and said connector is connected to a V35 connector of a connection destination through a predetermined conversion cable.

5. A V24/V28 and V35 common interface system according to claim 2, wherein when said system is used as the V24/V28 interface, said V24/V28 exclusive conversion unit is connected to said connector, and said connector is connected to an RS232C connector of a connection destination through an ordinary RS232C cable.

6. A common interface system comprising:

a common conversion circuit for receiving signals common to a plurality of interfaces of mutually different standards and performing interface conversion on each of the common signals;

a plurality of exclusive conversion circuits, each receiving a signal dedicated thereto and performing an interface conversion on the dedicated signal; and a single connector having compatibility with at least one standard associated with said plurality of interfaces, wherein one of said plurality of exclusive conversion circuits is selectively connected to said connector along with said common conversion circuit.

* * * * *